Nov. 27, 1962  E. L. ECKSTEIN  3,065,940
AIRCRAFT OUTER SURFACE COVERING

Filed June 22, 1956  2 Sheets-Sheet 1

INVENTOR.
EMIL LEOPOLD ECKSTEIN
BY *Wm. T. Wofford*
ATTORNEY

Nov. 27, 1962     E. L. ECKSTEIN     3,065,940
AIRCRAFT OUTER SURFACE COVERING
Filed June 22, 1956     2 Sheets-Sheet 2
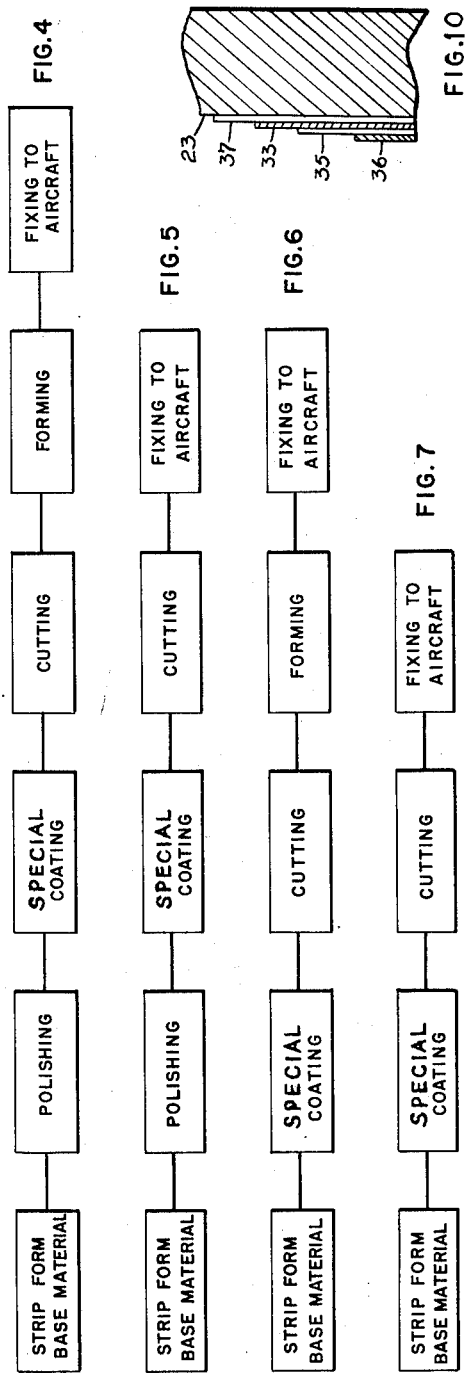
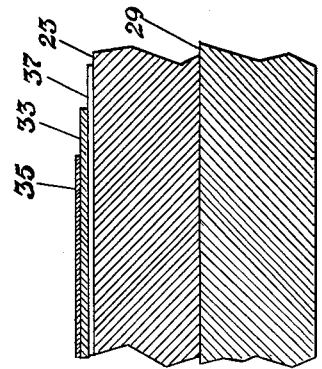
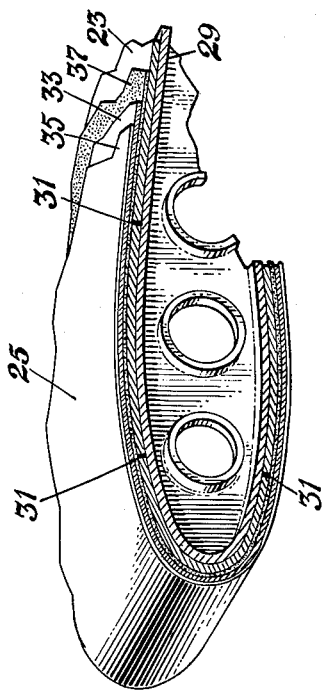
INVENTOR.
EMIL LEOPOLD ECKSTEIN
BY *Wm. T. Wofford*
ATTORNEY

United States Patent Office 3,065,940
Patented Nov. 27, 1962

3,065,940
AIRCRAFT OUTER SURFACE COVERING
Emil L. Eckstein, Cincinnati, Ohio
(8640 Olin St., Los Angeles 34, Calif.)
Filed June 22, 1956, Ser. No. 593,175
15 Claims. (Cl. 244—130)

My invention relates to aircraft, and more particularly to aircraft having particular types of outer surface covering or skin, and methods for providing and applying such covering or skin. The invention is applicable to both subsonic and supersonic aircraft, including missiles and the like. The term "aircraft" as used herein is intended to include all air vehicles except the non-powered balloon. This application is a continuation-in-part of my application Serial No. 316,309, filed October 22, 1952, now abandoned.

The end result which I seek to accomplish by my invention is the reduction of air resistance, commonly referred to as "drag," to a minimum. For the case of aircraft in subsonic flight, the drag consists of "induced drag" and "friction drag." The friction leads additionally to flow separation before the flow reaches the end of the aircraft body, thus creating a so-called "pressure drag" or "form drag." At higher subsonic speeds, the "friction drag" dominates the drag picture, being approximately sixty to eighty percent of the total drag in modern aircraft. For the case of aircraft in supersonic flight, the total drag consists of the "induced drag," the "friction drag," and the "wave drag," with the latter dominating. The "friction drag," however, still is important because of the heating effect created by it, which heating weakens and, as the supersonic speed increases, tends to melt the surface material.

An important reduction in the turbulent friction drag could be attained in today's aircraft if a much finer and more homogeneous surface smoothness could be provided. No exact definitions exist for the several surface conditions referred to variously as smooth, polished, superpolished, mirror-like, and others. For the purpose of this description a "smooth" surface is one exhibiting a roughness varying between 0.01 mm. and 0.0001 mm. very equally distributed over the entire surface; and an "extremely smooth" surface is one exhibiting roughness varying between .0001 mm. and .000001 mm. very equally distributed over the entire surface. These definitions are rather arbitrary ones; actually the roughness comes more gradually into the aerodynamic drag picture. The characteristics of aerodynamic laminar and turbulent "friction drag" on a flat plate have long been known; also the influence of different grades of roughness on the same. Practically, however, and for simplification reasons, it is of advantage to consider these two graduations. According to the present aerodynamic knowledge, it can be said that a surface condition of "smooth" on today's aircraft would contribute substantially toward achievement of a minimum turbulent friction which in turn results not only in less "friction drag," but also causes the separation point to occur further toward the trailing edge, thus creating less "pressure," or "form drag." This "form drag" represents an important drag element at high speeds in today's aircraft and missiles. While the profile shape of the aircraft is of importance as regards the "form drag"; once the aircraft is given a suitable streamlined form, the amount and type of "boundary layer" friction is of utmost importance.

If it were economically and practically feasible to provide an over-all surface condition of "extremely smooth" then such tremendous drag reduction could be obtained, that the economy of subsonic and supersonic aircraft operation would be revolutionized. The laminar "boundary layer" has a much smaller drag than the turbulent one, which drag might be approximately one-third down to one-seventh of the turbulent "friction drag." One of the conditions for a very extended laminar flow is "extreme smoothness" since every roughness creates cumulative fine disturbances which finally lead to transition from laminar to turbulent flow. Another condition is that the profile must be "laminar shaped." Still another condition is the artificial stabilization of the laminar "boundary layer." It is desired, of course, to have the "natural laminar flow," that is, laminar "boundary layer" without suction, extend as far toward the trailing edge as possible, before applying suction to enforce a laminar flow in the form of a "controlled boundary layer." To fulfill this desire, the first and most important requirement is "extreme smoothness"; additionally, precise form and extreme small waviness are required.

In addition to the above requirements, which are necessary for the performance of aerodynamic drag reduction and friction heat reduction and which might be called "Aerodynamic Requirements"; three other dominant requirements must be fulfilled by the aircraft's outer surface. First of these is "Physical-Chemical Requirement." Necessary surface properties to meet this requirement are chemical neutrality against the air, chemical neutrality against jet fuel, gasoline, and especially against rocket fuels; chemical neutrality against oils and greases; sufficient surface hardness, particularly in the leading edge regions; reflection of light, heat and electromagnetic radiation to avoid heating and other undesirable effects on the aircraft structure; total resistance against humidity of the air; adaptability to rapid and extensive temperature changes; small tendency for ice accretion; and adhesion of surface material to the aircraft body. All of the just-mentioned surface properties should be stable and not subject to rapid deterioration with time. Second is the "Economic Requirement." The cost of providing an outer surface for an aircraft having the desirable characteristics should be reasonable. The third requirement is for minimum "Maintenance and Repair." The required maintenance effort should of course be as small as possible. Repair and replacement, partially or totally, should be easy to accomplish and within reasonable costs. This latter is extremely important on the leading edges of the wings and on the noses of the bodies (fuselage, etc.).

It is accordingly the general object of my invention to provide an aircraft having outer surfaces of nature such that "drag" is reduced to a minimum.

Another object of my invention is to provide economically and practical feasible methods of producing an aircraft having minimum "drag" characteristics.

Another object of my invention is to provide economically and practically feasible methods of producing aircraft having outer surfaces of such nature as to achieve a maximum of laminar "boundary layer" extent.

Another object of my invention is to provide in an economically and practically feasible manner an aircraft over-all outer surface which is "extremely smooth," as hereinbefore defined.

Another object of my invention is to provide an aircraft wherein a minimum of suction effort is required to stabilize the laminar flow.

Another object of my invention is to provide economically feasible and practical methods of achieving an aircraft outer surface which meets requisite "Physical-Chemical" requirements as hereinbefore defined.

Another object of my invention is to provide economically feasible and practical methods of achieving aircraft outer surface which meets requisite "Maintenance and Repair" requirements as hereinbefore defined.

These and other objects are effected by my invention as will be apparent from the following description taken in accordance with the accompanying drawings, forming a part of this application, in which:

FIG. 3 is an enlarged partial section view of a wing portion of FIG. 2, showing an additional surface piece as superimposed on a portion of a structurally complete conventional aircraft, in accordance with my invention;

Figure 9:
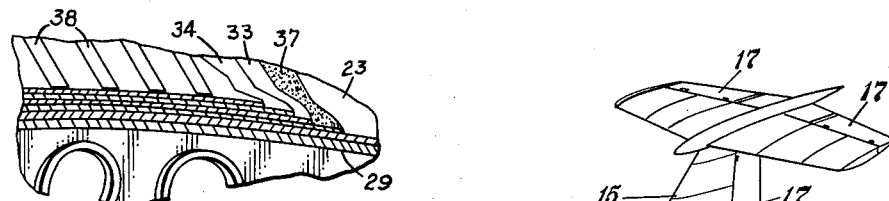

FIGS. 4, 5, 6, and 7 are flow diagrams showing various methods of carrying out the invention;

FIG. 8 is an enlarged detail section view showing a portion of FIG. 3;

FIG. 9 is a view similar to that of FIG. 3, but illustrating a conductive coating having a predetermined pattern; and FIG. 10 is an enlarged detail section view like FIG. 8, but showing more than one layer of coating material.

It is the leading idea of the invention to coat one side of a flexible band, such as sheet metal, plastic film, or the like in a continuously running process by vacuum vaporization or by cathode spraying in a vacuum, and then to cut from this so-coated flexible band suitable pieces, for example, skin pieces 33, and to attach, for instance glue, these pieces as a covering on the outer surface of an aircraft which is already manufactured with its essential structure before the said flexible and coated pieces are attached. The side of the flexible band to be coated may be prepared by polishing to achieve the "smooth," or the "extremely smooth" condition, the polishing being accomplished by a continuously running polishing process prior to the vacuum coating. In some cases the band surface to be coated need not be prepared by polishing, as for instance, if the band is a plastic film having a high degree of inherent smoothness. By "structurally completed aircraft" is meant the airworthy airframe. The various types of coating materials to be applied, their functions, and purpose will be hereinafter described.

For cases where the flexible band to be coated is material such as sheet metal, requiring the polishing treatment, and where the finished pieces are to be applied to a portion of an aircraft surface the shape of which requires forming, the flow diagram of FIG. 4 applies. For cases as just mentioned, but where no forming is required, the flow diagram of FIG. 5 applies. For cases where the band to be coated has sufficient smoothness as not to require the polishing treatment, as for instance plastic film, but where the finished piece is to be applied to a portion of an aircraft surface the shape of which requires forming, the flow diagram of FIG. 6 applies. For cases such as that last mentioned, but where no forming is required, the flow diagram of FIG. 7 applies. In general, forming is required where the portion of the aircraft surface to be covered by the particular coated piece is complex. In carrying out the process, the flexible band material to be coated is run off a drum through suitable polishing rolls and through the coating chambers and is then either wound up on another drum for storage prior to cutting, or it may be sheared in suitable lengths for production of a particular coated skin piece. If the finished piece is to be rectangular and of width equal to the band width, of course no further cutting is necessary. If the finished piece is such as to require additional cutting to achieve a special shape, then the sheared pieces may be stacked, and the stacks transferred to the special shape cutting device. The stacks may be cut to special shapes in any one of a number of well known ways, for example by using a template and a jig saw, or they may be cut by a suitably shaped blanking die. If forming is to be accomplished, it may be done by use of dies having the desired shape. The die surfaces should of course be very smooth and very well lubricated.

The term "vacuum coating" as used herein, includes both the vacuum vaporization process of coating and the process of cathode-spraying in a vacuum. Both of these vacuum coating processes, although already known outside the field of aviation, have not been applied in the aviation field except incidentally as on some window surfaces for light filtration purposes. The vacuum vaporization process has been applied to lenses of optical instruments by exposing the lens surfaces in a high vacuum to free moving atoms or molecules of vaporized materials and thus coated with a desired thin layer the thickness of which depends upon the time of exposure. The vacuum vaporization has also been applied to coating of optical reflectors with silver, and in a continuous process to metallize plastic fibers to give pleasing lustrous appearance, and also to coating for paper capacitors. The process of cathode-spraying in a vacuum has been applied to metallize non-metallic material to be used in production of phonograph records. In one vacuum coating process applied to metallic coating of plastic films, a roll of the uncoated plastic film is arranged in a large vacuum chamber with a vacuum of less than $10^{-5}$ mm. of mercury. The plastic film is slowly wound from this first roll to a second roll which is also in the vacuum chamber. On its way to the second roll, the film passes in proximity to a receptacle in which the coated metal is melted to the boiling point by induction heating for instance, and consequently is vaporized. The metal vapor condenses on the preferably cool surface of the moving plastic film to form a thin metallic coating with excellent adhesion. It is known that such a coating has a remarkable resistance to mechanical wear provided that it is applied to an "extremely smooth" surface. A sharp needle, for instance, moved over the coating with moderate pressure, does not scratch it at all, unless the needle point strikes one of the rare "failure spots." It is also known that such coatings, which can be obtained in thicknesses up to several thousand angstroms, are of an extremely clean structure with no impurities, and therefore are especially resistant against corrosion and chemical attack. On surfaces in the class of "extremely smooth," it has been noted that such coating has the tendency to further improve the smoothness quality.

Figure 1:
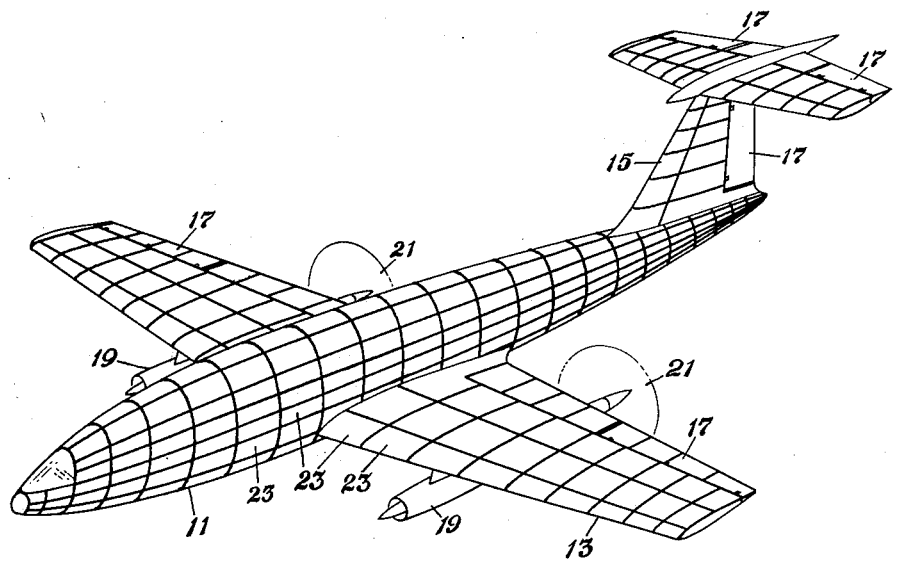
FIG. 1 is a perspective view of a structurally complete modern aircraft showing a conventional arrangement of skin pieces.

An aircraft which has already been manufactured "structurally complete" in accordance with conventional practice, is shown by FIG. 1. The aircraft includes fuselage 11, wings 13, tail assembly 15, and control surfaces 17. Propulsion power is supplied by a pair of turbo-prop engines 19 with pusher-propellers 21. The fuselage, wings, and tail assembly are covered with sheet metal plates 23 joined at marginal edges and riveted to the appropriate structural elements. The relatively heavy lines schematically outlining the joints between the adjacent plates emphasize the presence of unavoidable gaps that are present in such structure. In addition, there are present the surface breaks and protrusions (not shown) occasioned by rivet heads, screws, and the like, as well as surface waviness.

Figure 2:
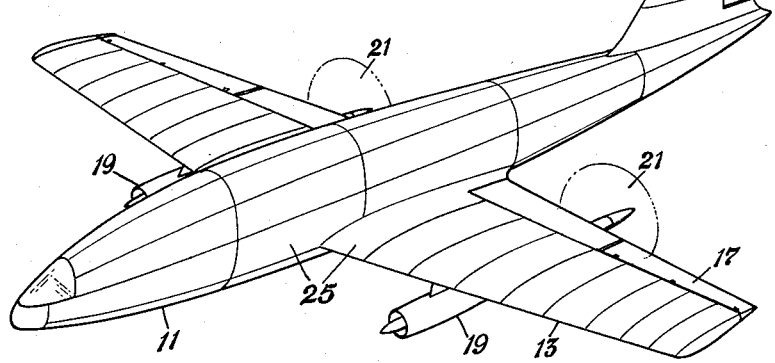
FIG. 2 is a perspective view of the same aircraft as shown by FIG. 1 except showing an arrangement of skin pieces that have been added in accordance with my invention.

The aircraft shown by FIG. 2 is the same aircraft as shown by FIG. 1, but with skin covering provided in accordance with my invention. The light lines schematically outlining the joints between adjacent skin pieces 25 are intended to illustrate the fineness of those joints and the minimizing of joint gaps. As illustrated, the skin pieces 25 applied in accordance with my invention may be much larger than the metal plates of the original aircraft, and serve to cover the metal plate joint gaps, rivets, screws, and the like. FIG. 3 is a section view of a typical wing portion showing a wing structural element 29 with plates 23 fixed to it, the plate joint gaps 31, and the skin pieces 25 provided according to my invention and fixed onto the outer surface of the plates. FIG. 8 is an enlarged section view of a portion of FIG. 3 showing in more detail and proportion, the various layers of material including, reading from bottom to top, the structural element 29, the sheet metal plate 23, adhesive film 37, skin piece base sheet 33, and skin piece coating 35. FIG. 10 is like FIG. 8 except that it shows more than one layer 35, 36 of coating material. In this view, the thickness of the adhesive layer is somewhat exaggerated, and the thickness of the coating is necessarily grossly exaggerated.

It will be appreciated that my invention is very useful both in the case of aircraft having essentially turbulent boundary layer flow and aircraft designed to have the so-called laminar flow profiles. If the aircraft in question has essentially a turbulent boundary layer flow, which practically all aircraft of today have because of the form of wing and fuselage and mutual arrangement of airframe and engines, then there is nothing to be gained by providing a surface roughness less than the finer grade of "smooth," since even with a much smaller roughness such aircraft still shows a turbulent boundary layer. If, however, the aircraft in question is designed to be a "laminarized aircraft," which means that it can have a laminar boundary layer, then to achieve complete laminar flow the fuselage and wing must not only be precisely formed and laminar shaped and the propulsion arranged so as not to disturb the laminar flow, but also the aircraft surface must achieve the "extremely smooth" condition. Consequently, the polishing procedure prior to the vacuum coating must result in a surface condition "extremely smooth" on the flexible band to be coated. A "laminarized" aircraft is necessary in order to obtain the ultimate degree of operating economy, and also to substantially reduce friction at supersonic speeds.

It is apparent that my invention fulfills the "aerodynamic" requirement hereinbefore mentioned, both for the case of the "turbulent" aircraft and the "laminarized" aircraft. In the case of a turbulent aircraft, the structural surface with all the gaps, rivet heads, waviness, screw slots, sharp edges, small holes, etc., is by practice of the invention replaced by the equally distributed smoothness of the attached coated pieces which forms a uniformly smooth surface. Overlapping, gaps, and ledges are eliminated. The edges of the coated skin pieces can be beveled to a fine edge before fixing onto the structure and onto each other. Thus, the turbulent friction itself will be reduced, the separation point delayed more toward the trailing edge, and therefore the form drag reduced. In the case of "laminarized" aircraft the invention provides an equally distributed "extreme smoothness" over substantially the entire surface, which is necessary if true laminar flow is to be obtained, which flow has heretofore in practice not even been approximated. If a wooden structure is used, especially for "laminarized" aircraft, the precise laminar shape can be worked on the aircraft by grinding or any suitable procedure on the already completed aircraft, with practically no resulting waviness. The porosity and roughness of the wood can be entirely covered by "extremely smooth" coated skin pieces.

It is further apparent that my invention fulfills the "Economic" requirement hereinbefore mentioned. The vacuum coating processes are relatively cheap, fast, and minal when considered in connection with the cost of uncomplicated procedures. The cost of even a platinum coating of several thousand angstroms thickness would be nomminal when considered in connection with the cost of an entire aircraft. The cost of the coated skin itself, which is attached as a covering over the aircraft, would be small. In the case of an aircraft with small contemplated loads, a plastic sheet, for instance an acetate sheet, would do the job. The attaching of the coated skin pieces by adhesives onto the aircraft is a simple manufacturing process of reasonable cost. Aside from my invention, there is no known way to apply a gold or platinum surface in an economic manner on the surfaces of today's aircraft. Even if such surfaces were applied without regard to cost, it would not help much since still gaps and other hereinbefore mentioned irregularities would remain.

With regard to the "Physical-Chemical" requirements hereinbefore mentioned, my invention makes possible and economically feasible the application of an almost infinite number of different surface materials and compositions to meet any specific "Physical-Chemical" requirements and without disturbing, and in some case even enhancing the smoothness quality of the surface coated. Some materials that could be used to great advantage as coatings, for example, are gold and platinum or their alloys with iridium, platinum, or rhodium. The two surface materials most commonly used today for almost all aircraft are aluminum alloy, or soft aluminum plated onto one side of the structural aluminum. Stainless steel has been used to a very limited extent on a few supersonic aircraft. Also, lacquered aircraft are still in use to a limited extent. The "Physical-Chemical" properties of the just mentioned materials are far inferior to those of platinum and gold or their alloys with iridium, platinum or rhodium, particularly as to resistance to chemically aggressive fuels. With a platinum coating or a platinum-iridium coating of several thousand angstroms, the optimum protection is achieved against every chemical aggression presently contemplated in the use of aircraft. In the case of laminarized aircraft such a platinum coating can even be considered as practically indestructible since the roughness of the coating can be made finer than "extremely smooth," and the action area left for chemical aggression is reduced to a minimum. The alloying with iridium makes the coating sufficiently hard and resistant against mechanical wear. Not only the already mentioned precious metals and their alloys but also metals such as chromium, nickel and their alloys give, for most practical applications in aviation, better protection against chemical aggression than the conventional surface materials used on today's aircraft. Additionally, that the contemplated coatings consist of extremely pure material, is still another reason for substantially reduced corrosion danger. The condition of hardness is also much better fulfilled with such suggested metal coatings than with the traditional surface materials, especially soft aluminum and lacquer. Since the surface provided by the invention is so much smoother (in the "laminar" case—a hundred or thousand times as smooth) than those of conventional aircraft, a better reflection of some types of radiation, for instance light and heat, will be obtained. Because of this finer and much more evenly distributed smoothness, the humidity of the air has much less attack possibility, and the tendency for ice accretion is accordingly substantially reduced in comparison with the conventional type surfaces. The skin pieces themselves will consist of materials which do not cause deleterious temperature stresses when the aircraft surface is rapidly heating or cooling. In other words, the material of the skin pieces can be chosen so that its temperature deformations closely follow those of the structural material of the aircraft.

With regard to "Maintenance and Repair" requirements, in the case of a coating consisting of a precious metal such as gold or platinum, essentially no maintenance need be considered since this coating has a practically infinite durability. Chromium or nickel or one of their alloys would also yield very good durability. An aircraft covering according to the invention can be easily repaired. The damaged or otherwise defective surface piece needs only to be peeled off and replaced by a new one.

For some special purposes it may be desirable to coat the skin pieces first with a layer obtained by a vacuum process and then with a second layer obtained by electrodeposition, as for instance when a thicker layer of chromium or chromium-alloy on the leading edge of a wing or the like is desired. The invention can be applied on a portion of, or on the entire surface of the aircraft. It is within the scope of the invention to have skin pieces with one type of coating on one portion of the aircraft and skin pieces with another type of coating on another portion of the aircraft. For instance, the front portion of the aircraft may be covered with skin coated with material having superior mechanical resistance properties and the aft portions with pieces coated with softer material. Although the invention has been thus far described as utilizing "vacuum coating" only, it should be made clear that the invention does not reside in any specific coating process per se, and that any coating process capable of achieving results equivalent to those obtainable by "vacuum coating," is within the contemplation of the invention. Accordingly, the term "special coating" is meant to include both "vacuum coating" and any other coating process capable of achieving results equivalent to those obtainable by "vacuum coating." The single atoms or molecules of many possible coating materials when shot against the surface to be coated in either the vacuum vaporization or the cathode-spraying process will stick very tight on the coated surface. If for some special physical reasons the desired coating materials will not adhere satisfactorily when applied by the said vacuum coating methods directly on the surface to be coated, then another material having satisfactory adhering properties can be applied as a first coating and in a second procedure the selected material may be applied as the outside coating onto the intermediate coating. For smaller aircraft, such as gliders, sport planes, and medium transports, it can be advantageous to use a plastic film as a material to be coated. It would be particularly desirable to use a plastic material the molecules of which are string-like macromolecules. A coating of the selected material is then applied to this plastic film which is already smooth by nature. In the case of some such smaller aircraft, it is within the scope of the invention to apply the skin pieces in accordance with the invention directly onto the airframe skeleton, so that such skin pieces function also as structural elements. Sometimes it is necessary to provide a coating which is an alloy of a metal with a small amount of another metal, in order to make the resulting coating harder. This is the case for instance, when platinum is alloyed with iridium. If such an alloy coating is desired, then first the main metal may be coated onto the material to be coated and in a separate process the second metal may be applied which will then go into alloy with the first one. A special effect of decreasing the sub-microscopic roughness of the condition "extremely smooth" may be obtained by using longitudinal polishing before the coating is applied. By this is meant such a polishing in which all the submicroscopic fine polishing grooves run parallel and in one direction. By later arranging the coated pieces on the aircraft in such a way that the polishing direction falls in the air flow direction, the optimum smoothness for aerodynamic purposes is obtained. For exampe, if the average depth of a fine submicroscopic polishing groove is 50 angstroms then the submicroscopic hyperfine inaccuracies alongside the slopes of these grooves (in flow direction) will certainly be substantially smaller than 50 angstroms. It has been experienced that it is rather difficult to provide a coating of a thickness of more than two thousand to three thousand angstroms in a single coating procedure. It is therefore of advantage to run the band to be coated through the vacuum chamber, then run it again through the chamber to provide a second coating of the same material, and repeat the process until the desired thickness is achieved.

It can be of advantage to provide an electric current carrying coating 38 (see FIG. 9) on the skin surface to influence the boundary layer of the flowing medium by various electrical measures, or for the purpose of radar or the like. By using the invention, such electric current carrying surface can be obtained without introducing any additional drag. This electric current carrying coating is applied on an insulating base layer 34, the latter being either an insulating skin itself or an intermediate insulating layer between the skin and the outside electric current carrying coating. It is within the scope of the invention to provide such electric current carrying coatings on the surface which have special shapes or patterns. For example, the outline contour of the coating can be shaped like a saw with many sharp teeth for the purpose of spraying electric charges into the flowing medium. Another possible shape of the electric current carrying coating consists of a grill-like pattern with parallel strips. This pattern could be used for example, to influence the boundary layer of the flowing medium by means of oscillating currents running through the different strips of the pattern. Any desired pattern of electric current carrying layer can easily be obtained by using the invention.

The foregoing disclosure and the showings made in the drawings are merely illustrative of the principles of this invention and are not to be interpreted in a limiting sense.

I claim:

1. An aircraft having the normal surface covering of a structurally completed aircraft and having an outer surface covering comprising skin pieces each consisting of a thin base sheet having thereon a layer of coating material, such that the coating outer surface will have substantially the same degree of smoothness as the base sheet, said skin pieces being fixed, after coating to said normal surface covering.

2. An aircraft having the normal surface covering of a structurally completed aircraft and having an outer surface covering comprising skin pieces each consisting of a thin base sheet having a "smooth" surface and having thereon a layer of coating material, such that the coating outer surface will have substantially the same degree of smoothness as the base sheet, said skin pieces being fixed to said normal surface covering.

3. A "laminarized" aircraft having the normal surface covering of a structurally completed aircraft, and having an outer surface covering comprising skin pieces each consisting of a thin base sheet having an "extremely smooth" surface and having thereon a layer of coating material, such that the coating outer surface will have substantially the same degree of smoothness as the base sheet, said outer surface covering being fixed to said normal surface covering.

4. An aircraft having the normal surface covering of a structurally completed aircraft and having a first portion of its outer surface covered with skin pieces each consisting of a thin base sheet having thereon a layer of a first coating material, a second portion of its outer surface covered with skin pieces each consisting of a thin base sheet having thereon a layer of a second coating material, such that the coating outer surface will have substantially the same degree of smoothness as the base sheet, said skin pieces being fixed to said normal surface covering.

5. An aircraft having the normal surface covering of a structurally completed aircraft and having an outer surface covering comprising skin pieces each consisting of a thin base sheet having thereon a first layer of coating material selected for good adherence characteristics and a second layer of coating material selected for its physical surface characteristics, and such that the coating outer surface will have substantially the same degree of smoothness as the base sheet, said skin pieces being fixed to said normal surface covering.

6. An aircraft having the normal surface of a structurally completed aircraft and having an outer surface covering comprising skin pieces each consisting of a thin base sheet of plastic material having thereon a layer of metallic coating material, such that the coating outer surface will have substantially the same degree of smoothness as the base sheet, said skin pieces being fixed to said normal surface covering.

7. An aircraft having the normal surface of a structurally completed aircraft and having an outer surface covering comprising skin pieces each consisting of a thin base sheet of plastic material the molecules of which are string-like macromolecules, said base sheet having thereon a layer of conductive coating material, such that the coating outer surface will have substantially the same degree of smoothness as the base sheet, said skin pieces being fixed to said normal surface covering.

8. An aircraft having the normal surface of a structurally completed aircraft and having an outer surface covering comprising skin pieces each consisting of a thin base sheet having thereon a plurality of layers of different coating materials, such that the coating outer surface will have substantially the same degree of smoothness as the base sheet, said skin pieces being fixed to said normal surface covering.

9. An aircraft having the normal surface of a structurally completed aircraft and having an outer surface covering comprising skin pieces each consisting of a non-conductive thin base sheet having thereon a layer of conductive coating material having a predetermined pattern and such that the coating outer surface will have substantially the same degree of smoothness as the base sheet, said skin pieces being fixed to said normal surface covering.

10. An aircraft having the normal surface covering of a structurally completed aircraft and having an outer surface covering comprising skin pieces each consisting of a thin base sheet having thereon a layer of coating material consisting of a precious metal and such that the coating outer surface will have substantially the same degree of smoothness as the base sheet, said skin pieces being fixed to said normal surface covering.

11. An aircraft having the normal surface covering of a structurally completed aircraft and having an outer surface covering comprising skin pieces each consisting of a thin base sheet having thereon a layer of coating material consisting of a precious metal alloy, and such that the coating outer surface will have substantially the same degree of smoothness as the base sheet, said skin pieces being fixed to said normal surface covering.

12. An aircraft having the normal surface covering of a structurally completed aircraft and having an outer surface covering comprising skin pieces each consisting of a thin base sheet having a "smooth" surface and having thereon a layer of coating material of average thickness in the range 0.01 mm. to 0.0001 mm., said skin pieces being fixed to said normal surface covering.

13. An aircraft having the normal surface covering of a structurally completed aircraft and having an outer surface covering comprising skin pieces each consisting of a thin base sheet having an "extremely smooth" surface and having thereon a layer of coating material of average thickness in the range 0.0001 mm. to 0.000001 mm., said skin pieces being fixed to said normal surface covering.

14. An aircraft having the normal surface covering of a structurally completed aircraft and having an outer surface covering comprising skin pieces each consisting of a thin base sheet having an "extremely smooth" surface and having thereon a layer of coating material comprising a precious metal of average thickness in the range 0.0001 mm. to 0.000001 mm., said skin pieces being fixed to said normal surface covering.

15. An aircraft having the normal surface of a structurally completed aircraft and having an outer surface covering comprising skin pieces each consisting of a conductive thin base sheet having thereon a layer of conductive coating material having a predetermined pattern and insulated from said base sheet by an intermediate non-conductive layer, said layers being such that the coating outer surface will have substantially the same degree of smoothness as the base sheet, said skin pieces being fixed after coating to said normal surface covering.

References Cited in the file of this patent

UNITED STATES PATENTS

| | | |
|---|---|---|
| 54,083 | Warren | Apr. 17, 1866 |
| 1,243,655 | Clark | Oct. 16, 1917 |
| 1,674,941 | Bart | June 26, 1928 |
| 1,771,567 | Auld | July 29, 1930 |
| 1,909,862 | Honegger | May 16, 1933 |
| 2,384,500 | Stoll | Sept. 11, 1945 |
| 2,400,918 | Cosler | May 28, 1946 |
| 2,417,586 | Crosley | Mar. 18, 1947 |
| 2,665,227 | Clough et al. | Jan. 5, 1954 |
| 2,709,569 | Roush | May 31, 1955 |
| 2,732,020 | Scholl | Jan. 24, 1956 |
| 2,791,668 | Cowdrey et al. | May 7, 1957 |
| 2,805,974 | Brucker | Sept. 10, 1957 |
| 2,946,541 | Boyd | July 26, 1960 |

FOREIGN PATENTS

| | | |
|---|---|---|
| 635,784 | Great Britain | Apr. 19, 1950 |